G. HOEPNER.
WEIGHING AND FILLING MACHINE.
APPLICATION FILED FEB. 15, 1912.
1,044,527.
Patented Nov. 19, 1912.
4 SHEETS—SHEET 2.
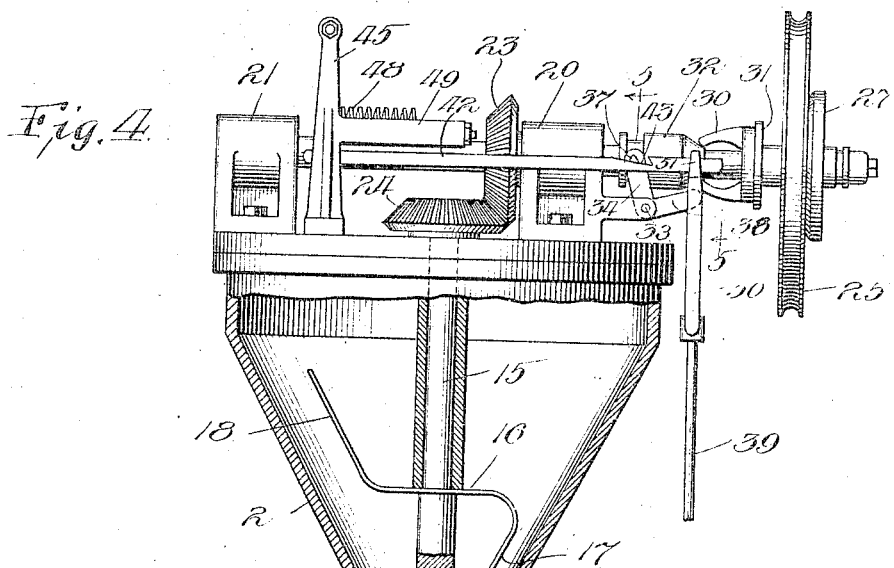
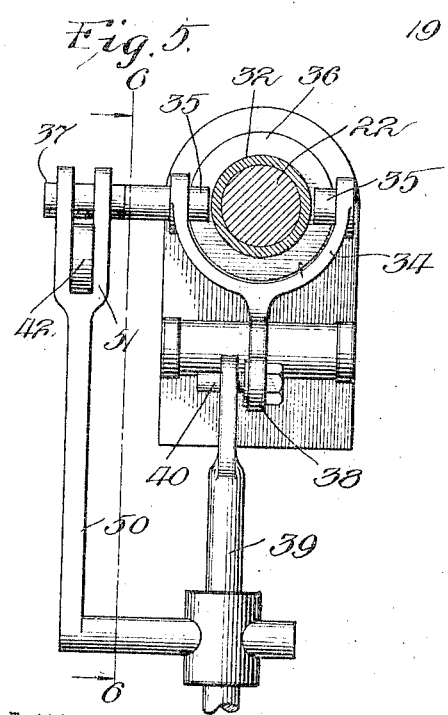
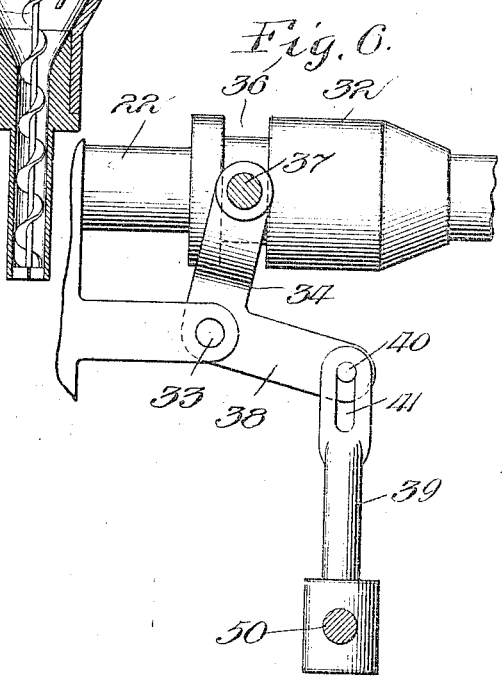
Witnesses:
Harry S. Gaither
Ruby V. Brydges
Inventor:
George Hoepner
By Chamberlin & Freudenreich
Att'ys.

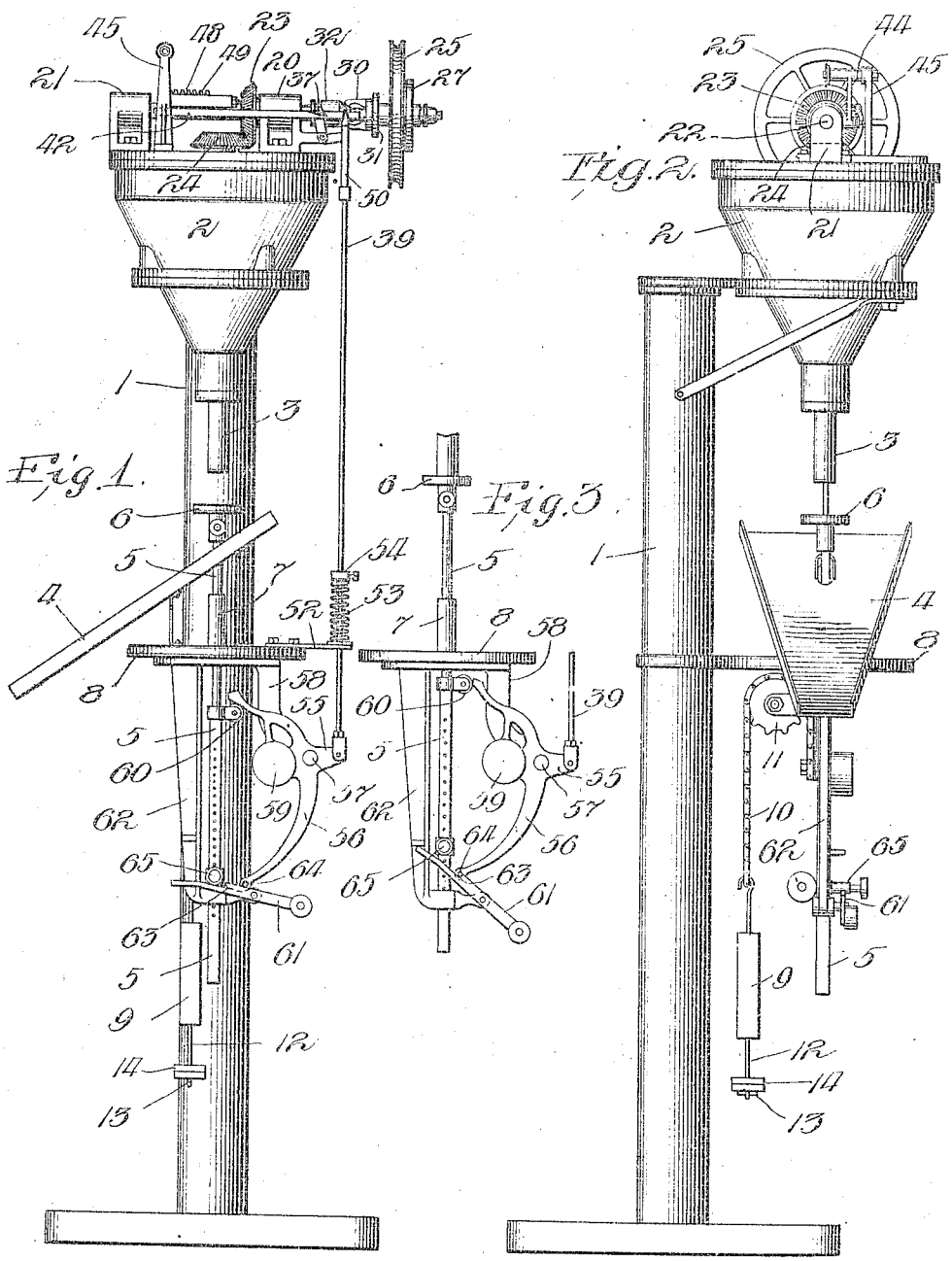

G. HOEPNER.
WEIGHING AND FILLING MACHINE.
APPLICATION FILED FEB. 15, 1912.
1,044,527.
Patented Nov. 19, 1912.
4 SHEETS—SHEET 3.
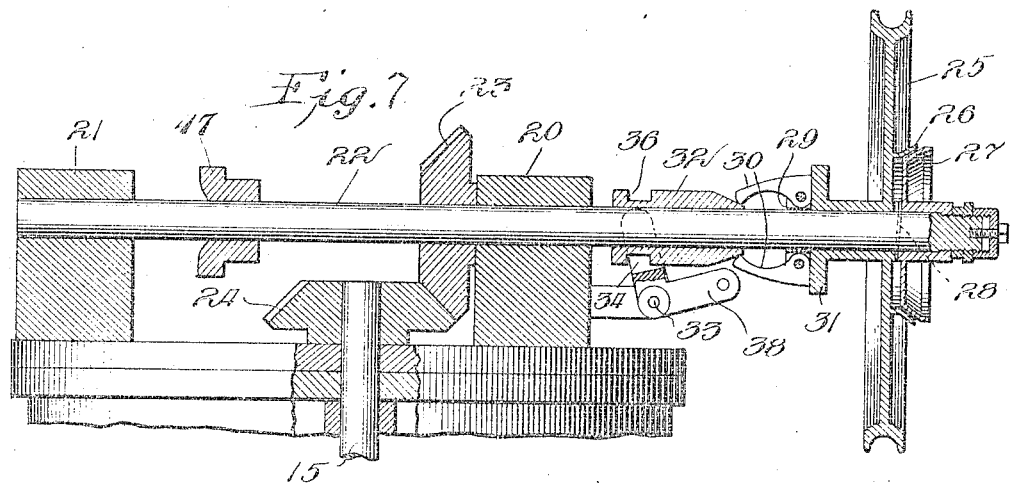
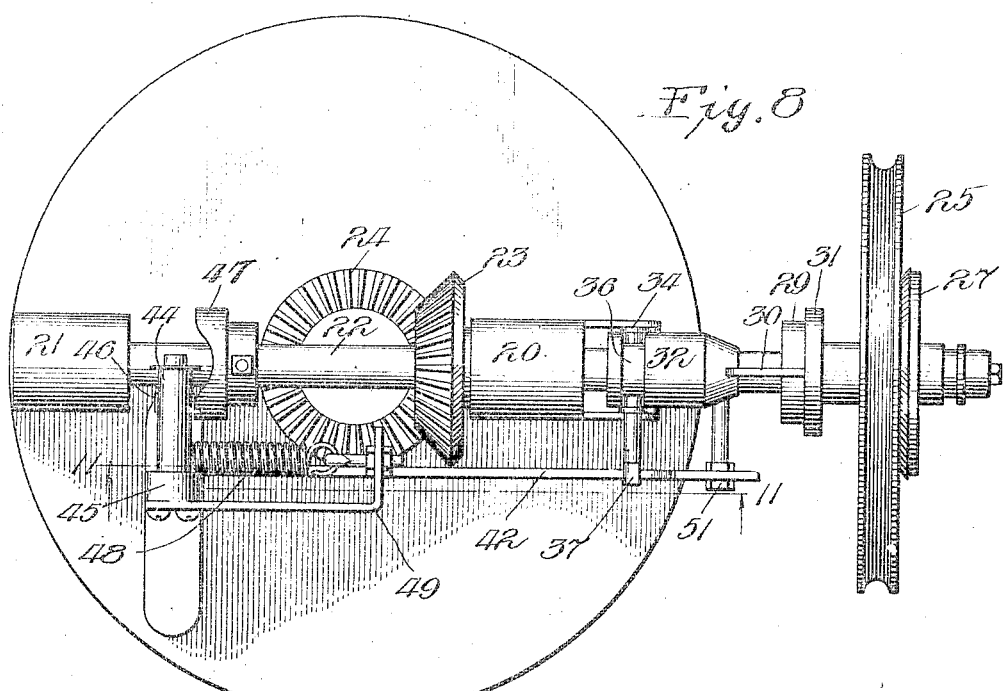

G. HOEPNER.
WEIGHING AND FILLING MACHINE.
APPLICATION FILED FEB. 15, 1912.
1,044,527.
Patented Nov. 19, 1912.
4 SHEETS—SHEET 4.
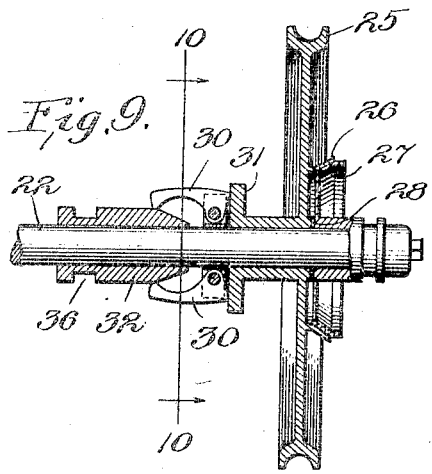
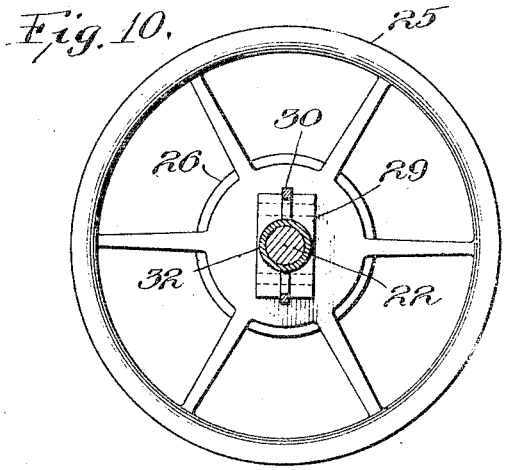
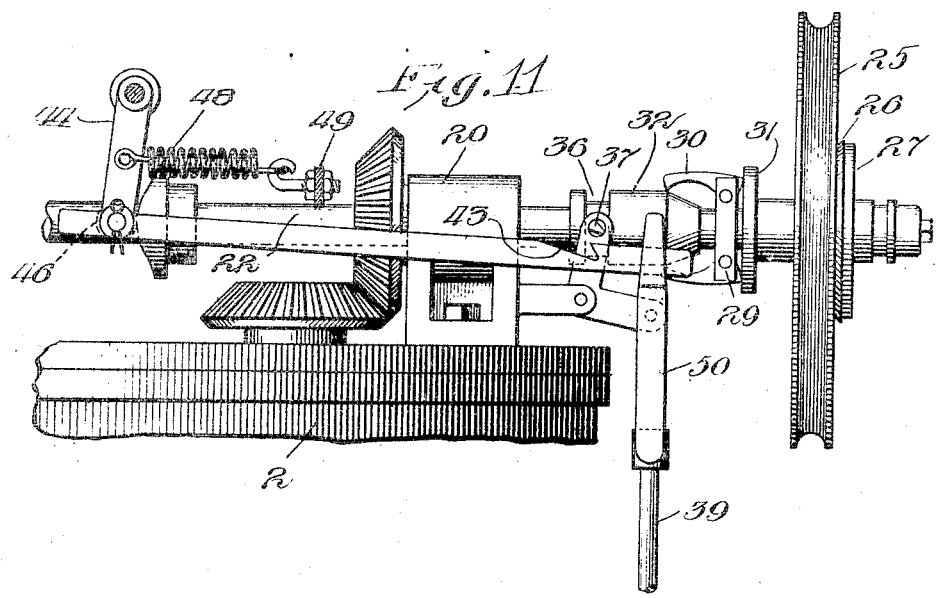
Witnesses:
Harry S. Gaither
Ruby V. Brydges
Inventor:
George Hoepner
By Chamberlin & Freudenreich,
Att'ys.

UNITED STATES PATENT OFFICE.

GEORGE HOEPNER, OF CHICAGO, ILLINOIS.

WEIGHING AND FILLING MACHINE.

1,044,527.

Specification of Letters Patent.

Patented Nov. 19, 1912.

Application filed February 15, 1912. Serial No. 677,685.

*To all whom it may concern:*

Be it known that I, GEORGE HOEPNER, a citizen of the United States, residing at Chicago, county of Cook, State of Illinois, have invented a certain new and useful Improvement in Weighing and Filling Machines, and declare the following to be a full, clear, and exact description of the same, such as will enable others skilled in the art to which it pertains to make and use the same, reference being had to the accompanying drawings, which form a part of this specification.

My invention relates to that type of machine which forces material into a yieldingly supported receptacle to be filled and through the material moves the receptacle as the filling progresses; and it has for its object to produce a simple and effective arrangement for accurately controlling the filling mechanism.

The various features of novelty whereby my invention is characterized will hereinafter be pointed out with particularity in the claims; but, for a full understanding of my invention and of its object and advantages, reference may be had to the following detailed description taken in connection with the accompanying drawings, wherein:

Figure 1 is a side elevation of a machine arranged in accordance with a preferred form of my invention; Fig. 2 is a front elevation of the machine; Fig. 3 is a side elevation of the tripping mechanism in a different position from that shown in Fig. 1; Fig. 4 is a view partly in side elevation and partly in vertical section of the hopper and the mechanism above it, the parts being in the same position as in Fig. 1; Fig. 5 is a section on an enlarged scale approximately on the broken line 5—5 of Fig. 4; Fig. 6 is a section taken on line 6—6 of Fig. 5; Fig. 7 is a vertical section taken through the driving mechanism parallel with the axis of the driving shaft; Fig. 8 is a top plan view of the hopper and the driving mechanism supported thereby; Fig. 9 is a view corresponding to the right hand portion of Fig. 7, parts in the two figures being shown in different positions; Fig. 10 is a section on line 10—10 of Fig. 9; and Fig. 11 is a section taken on line 11—11 of Fig. 8.

Referring to the drawings, 1 represents a pedestal or other suitable support carrying at its upper end a suitable container 2 for material to be packaged, which I shall refer to as a hopper since it will usually though not necessarily be a hopper. The hopper terminates at its lower end in a spout 3 in the form of a thin tube shaped so as to fit within a can or other receptacle to be filled and having a length equal to or somewhat greater than the depth of such receptacle. Below the spout may be placed the usual inclined chute 4 for deflecting any material which may drop from the spout when there is no receptacle in place to receive it, thus preventing such material from clogging the tripping or controlling mechanism beneath. Extending upwardly through the chute is a vertically yieldable rod 5 having on its upper end a seat 6 for a receptacle to be filled. In the arrangement shown, the rod 5 is guided in a hub-like bearing 7 projecting upwardly from the center of a table or platform 8 fixed to and projecting laterally from the post or pedestal at a point beneath the chute. The rod is free to slide vertically under the control of a counter-balance of some sort. In the arrangement shown, the counter-balance takes the form of a weight 9 secured upon one end of a sprocket chain 10 which passes over a sprocket wheel 11 carried on the underside of the table or platform, and is secured at its other end to the rod. The weight is provided with suitable means for receiving additions so that the counter-balancing effect may be varied to suit the conditions necessitated by any particular kind of work. In the arrangement shown, the weight is provided with a downwardly projecting stem 12 having an adjustable transverse seat or shoulder 13 at its lower end. Small weights, as indicated at 14, may be slipped upon the stem above the seat or shoulder when a heavier counter-balance than that afforded by the main weight itself is required.

A receptacle to be filled is placed upon the head or seat 6 on the upper end of the rod and the rod is then raised or permitted to rise until the spout is seated against the bottom of the receptacle. Suitable feeding mechanism is now automatically set in operation and it feeds the material to be packaged through the spout into the receptacle. In the arrangement shown there is a vertical shaft 15 suitably supported at the axis of the hopper and extending down into the hopper. On this shaft is a suitable stirrer 16 having an arm 17 extending down toward the outlet end of the hopper in proximity to and parallel with the side of the hopper. A second arm 18 extends upwardly and parallel with the sides of the hopper. On the lower end of the shaft 15 is a spiral or screw 19 which extends down through the spout to the lower end thereof, the screw fitting within the spout so that as it is rotated it will positively carry material to be packaged down through the spout and eject it into the lower end of the latter. It will be seen that when the shaft 15 is set in operation, a receptacle being in place beneath the spout, the material to be packaged will be fed through the spout into the receptacle, being packed into the bottom of the receptacle and gradually rising in the receptacle until the latter is filled. As the material enters the receptacle the receptacle is forced down against the resistance of the counterbalance. The density which the material in the receptacle will have depends upon the counter-balance, the density becoming greater as the counter-balance is increased. Consequently, by properly adjusting the counterweight, the weight of the goods packed in a receptacle may be accurately determined provided the feeding of the goods can always be stopped accurately at a predetermined point. My invention relates particularly to the control of the feeding mechanism so as to insure a stopping of the feed at just the proper point. To this end I have provided power mechanism for driving the feed device, together with power-actuated means for disconnecting the feed device from the driving mechanism, the power-actuated means being controlled by the supporting member for the receptacle so that only a small impulse or force, too small to interfere with the delicacy of the weighing, is required to set in motion the mechanism for stopping the feed. The driving mechanism is as follows: Mounted in suitable bearings 20 and 21 above the hopper is a horizontal shaft 22. A beveled gear wheel 23 on this shaft meshes with a complementary gear 24 on the upper end of the shaft 15. Consequently, when the shaft 22 revolves the feeding mechanism is in operation. On one end of the shaft 22 is a driving pulley 25, loosely mounted so as to be free to move relatively with respect to the shaft both in the axial and in the circumferential direction. On one side of the driving pulley is a clutch drum 26 adapted to coöperate with a clutch cone 27 fixed upon the shaft. 28 is a spring arranged between the pulley and the clutch cone so as to hold the two clutch members normally out of operation with each other, thus interrupting the driving connection between the pulley and the shaft. Fixed to the shaft near the pulley is a collar 29 on which are pivoted two dogs 30. The pulley is provided with a hub having a flange 31 extending into proximity to the dogs 30. The dogs are preferably so arranged as to constitute in effect bell-crank levers each having a short arm for engagement with the flange on the pulley hub and a long arm to be engaged by an operating member. This multiplies the power of the operating member so that when the dogs are oscillated thereby a powerful pressure is exerted upon the pulley to force it into engagement with the clutch cone. The dogs may conveniently be oscillated by means of a cone 32 slidably mounted on the shaft 22. When the cone 32 is slid along the shaft toward the dogs, it forces the ends of the long arms of the dogs apart and causes the driving pulley to move into engagement with the clutch cone. When the cone 32 is drawn back, the spring 28 forces the pulley into its idle position. The immediate operating means for the cone 32 is a bell-crank lever fulcrumed at its elbow upon a bracket extending from the bearing 20 as indicated at 33, one arm of the bell-crank lever being in the form of a yoke or fork 34 provided with pins 35 which extend into a groove 36 in the controlling cone. The arm 34 is provided with a laterally projecting finger 37 which is adapted to be engaged by the power device to be hereinafter described for the purpose of effecting the release of the clutch. The other arm, 38, of the bell-crank lever is connected to the upper end of a controlling rod 39 by means of a pin 40 which passes through an elongated vertical slot 41 in the rod; this connection providing a lost motion which permits the rod 39 to move vertically a limited distance without affecting the lever. The rod 39 extends down beside the yieldable support for the receptacle so as to be controlled thereby in a manner to be hereinafter described.

The power-actuated means for operating the bell-crank lever and thus effecting the release of the clutch consists of an arm or bar 42 which lies beside the shaft 22 and is reciprocated by the shaft when the latter is in motion. The arm or bar has in its upper edge or face a notch 43 which is adapted to engage with the pin or finger 37 on the bell-crank lever and swing the lever back far enough to effect the release of the clutch. The arm or bar has not only a reciprocatory movement but also an independent movement between an operative position and an inoperative or idle position. As long as the arm or bar is in its inoperative position it is clear of the pin 37 and may reciprocate without affecting the clutch; but when the arm or bar is shifted into its operative position the pin or finger 37 drops into the notch and is carried back so as to throw the bell-crank lever into the clutch releasing position. The arm or bar may be constructed and actuated in any suitable manner although for the sake of brevity I have illustrated only a single preferred arrangement. In the arrangement illustrated, the end of the arm or bar opposite to that in which the notch is located is pivotally supported upon a hanger 44 which in turn is hung from a stationary bracket 45 so as to be capable of swinging about a horizontal axis. On the lower end of the hanger is a roller 46 which is adapted to be engaged by a cam 47 secured upon the shaft 22. A spring 48, connected at one end to the hanger and at its other end to a member 49 on the stationary bracket, tends to swing the hanger in the direction to carry the arm or bar toward the driving pulley, thus holding the roller always against the cam. Therefore as the cam rotates the arm or bar is moved in one direction of the cam and in the opposite direction by the spring, making one or more reciprocations for each revolution of the main shaft, depending upon the number of high points on the cam. The movement which is thus given to the arm or bar is enough to effect the release of the clutch after the arm or bar has been swung about its pivot from its inoperative position to its operative position. The arm or bar is controlled by the rod 39, this rod having a lateral forked extension 50 at its upper end, the arm or bar lying in the fork 51 of this extension. When the rod 39 is raised, the arm or bar is lifted so as to bring it into operative relation to the finger 37 so that as the arm or bar is drawn back by the cam it engages with the finger and throws the bell-crank lever into the clutch-releasing position. This movement of the controlling rod is permitted by the pin and slot connection between it and the bell-crank lever so that the controlling rod does not have to move the bell-crank lever in order to bring the actuating arm or bar into operative position. In Figs. 1 and 4 the actuating bar or arm is shown in its operative position, the bell-crank lever having been thrown back so as to release the clutch. In Fig 11 the controlling bar or arm is shown in its inoperative position, with the clutch in operation. It will be seen that in Figs. 1 to 4 the finger 37 on the bell-crank lever is farther back than it would be thrown by the actuating arm. This is accomplished by the controlling rod 39 as will be hereinafter explained, in order that the finger on the lever may be freed from the shoulder on the actuating arm and thus offer no resistance to the dropping of the arm into its inoperative position when the controlling rod is lowered.

The means for controlling the rod 39 is best illustrated in Figs. 1, 2 and 3. Referring to these figures, 52 is a bracket or shelf through which the controlling rod extends and by which it is guided, the bracket or shelf being secured to the platform 8. Surrounding the rod above the member 52 is a spring 53 which engages at one end with the member 52 and at its other end with a collar 54 fixed upon the rod. The spring is under such tension that it tends constantly to lift the controlling rod into the positions indicated in Figs. 1 and 4, namely into the position to carry the bell-crank lever back to the limit of its movement in the clutch-releasing direction. The lower end of the controlling rod is connected to an arm 55 projecting from a C-shaped member 56 which is pivotally mounted as at 57 on a bracket 58 extending down from the platform 8. The member 56 is provided with a counter-weight 59 which assists the spring 53 in raising the controlling rod. On the member 5 at a point somewhat below the platform is a roller 60 which is adapted to engage with the upper end of the C-shaped member as the member 5 rises, and swing the C-shaped member in the direction to draw down the controlling rod. There is a swinging, gravity-actuated dog 61 pivotally mounted on a bracket 62 which extends down from the platform 8 and serves as a guide for the lower end of the rod 5; this dog having a shoulder 63 which is adapted to engage with a pin 64 on the lower end of the C-shaped member in one position of the parts and lock the C-shaped member against backward movement. On the rod 5 is a pin or finger 65 which is adapted to be adjusted lengthwise of the rod, the member 65 being so arranged that when the rod 5 is pressed down it will strike the dog 61 and cause it to release the C-shaped member. The parts are so proportioned and arranged that when a receptacle is placed upon the seat 6 at the upper end of the rod 5 and the rod is raised so as to bring the receptacle about the discharge spout, the roller 60 engages with the C-shaped member and swings it so as to draw the controlling rod down far enough to place the clutch in operation. During the upward movement of the member 5 the finger 65 travels away from the dog 61 and permits the dog to swing from the position shown in Fig. 1 to that shown in Fig. 3, the latter position being that in which the dog locks the C-shaped member. As I have heretofore explained, as soon as the clutch is thrown in the feeding material is packed into a receptacle and the receptacle begins to descend. As the receptacle and its support descend the roller 60 drops away from the C-shaped member, leaving the latter locked against the tendency of the spring and the weight to oscillate it, by means of the dog 61. The finger 65 is so positioned on the rod 5 that it engages with the dog and presses it out of engagement with the C-shaped member when the receptacle has received the desired charge. There is now nothing to hold the C-shaped member and therefore the spring 53 and the weight 59 come into play, oscillating the C-shaped member and raising the controlling rod until the arm or bar 42 is brought into its operative position and the controlling bell-crank lever for the clutch is drawn back. The resistance to the upward movement of the rod is now removed and the rod continues its upward movement and oscillates the bell-crank lever farther in the clutch-releasing direction so as to bring the finger 37 thereon clear of the engaging shoulder on the arm or bar. As soon as the clutch is thrown out the feeding of the material stops and it does not begin again until the filled receptacle has been removed and a new receptacle has been placed in the filling position. The lifting of the yieldable support for the receptacle, to bring the receptacle into its filling position, draws down the controlling rod as I have heretofore explained and again throws the clutch in so that the feeding mechanism comes into play and begins to feed material into the empty receptacle. As the material collects in the receptacle, the latter is depressed in the manner heretofore explained until the point is reached where the receptacle is filled and then the clutch is again thrown out and the feed stopped until a new receptacle is placed in position.

It will thus be seen that I have provided a simple and effective means for positively controlling the feeding of the material to be packaged with the expenditure of only a slight force upon what may be termed the master controller which is in turn governed by the support. Consequently successive charges may be measured very accurately so that there will be practically no deviation from the unit of weight for which the machine is set.

While I have illustrated and described with particularity only a single preferred form of my invention I do not desire to be limited to the particular structural details thus illustrated and described; but intend to cover all forms and arrangements which come within the terms employed within the definitions of my invention constituting the appended claims.

I claim:

1. In combination, a container for material to be packaged, a yieldable member adjacent to the container for engaging a receptacle to be filled, a feeding device for forcing material from the container into a receptacle engaged by the aforesaid member and through the material entering the receptacle forcing said member away from the container, a driving member for said device, a controller for said driving member, power-actuated means for actuating said controller, and a master controller governed by said yieldable member for controlling said power-actuated means.

2. In combination, a container for material to be packaged, a yieldable support adjacent to the container for holding a receptacle to be filled, a feeding device for forcing material from the container into a receptacle held by the support, and through the material entering the receptacle forcing said support away from the container, a driving member for said device, a controller for said member, power-actuated means for actuating said controller, and means controlled by said support for governing said means.

3. In combination, a hopper, a yieldable support below the hopper for a receptacle to be filled, a power-actuated device for forcing material from the hopper into a receptacle held by the support and through the material entering the receptacle forcing said support away from the hopper, a controller for said device, a power-actuated member for actuating said controller, and means controlled by said support for governing said member.

4. A hopper, a yieldable support adjacent to the hopper for a receptacle to be filled, a device in said hopper for progressively forcing material from the hopper into a receptacle held by the support, a driver for said device, a clutch between said driver and said device, means actuated by said driver for releasing the clutch, and means controlled by said support for governing the aforesaid means.

5. A hopper, a yieldable support adjacent to the hopper for a receptacle to be filled, a device in said hopper for progressively forcing material from the hopper into a receptacle on the support, a driver for said device, a clutch between said driver and said device, a member actuated by said driver for causing the release of the clutch, and a controller for said member actuated by said support.

6. A hopper, a yieldable support below the hopper for a receptacle to be filled, a feeding device in said hopper for progressively forcing material from the hopper into said receptacle, a driving shaft for said device, a driving element, a clutch between said shaft and said element, a member actuated by said shaft for causing the release of the clutch, and means controlled by said support for governing said member.

7. In combination, a hopper, a yieldable support adjacent the hopper for a receptacle to be filled, an adjustable counterweight for said support, a power-actuated device for forcing material from the hopper into a receptacle on the support, a controller for said device, a power-actuated member for governing said controller, and means controlled by said support for governing said member.

8. In combination, a hopper, a yieldable support below the hopper for a receptacle to be filled, an adjustable counterweight for said support, a power-actuated device for forcing material from the hopper into a receptacle on the support, a controller for said power device, a power-actuated member for actuating said controller, and means actuated by said support for governing said member.

9. In combination, a container for material to be packaged, a yieldable element adjacent to the container for engaging a receptacle to be filled, a power-actuated device for forcing material from the container into a receptacle engaging with the aforesaid element and through the material forcing said element away from the container, a controller for said device, a power-actuated member for governing said controller, said member having an operative and an inoperative position, and means controlled by said element for moving said member from its inoperative position into its operative position.

10. In combination, a hopper, a yieldable support below the hopper for a receptacle to be filled, a device in the hopper for forcing material from the hopper into a receptacle on the support, a driving shaft for said device, a driving element for said shaft, a clutch between said element and said shaft, mechanism driven by said shaft and adapted to cause the release of said clutch, said mechanism including a clutch-actuator having an operative position and an inoperative position, and means controlled by said support for moving said clutch-actuator from its inoperative position into its operative position.

11. In combination, a container for material to be packaged, a yieldable element adjacent to the container for engaging with a receptacle to be filled, a device in the hopper for forcing material from the hopper into a receptacle engaged by said element and through the material forcing said element away from the container, a driving shaft for said device, a driving pulley loose on said shaft, a clutch between said pulley and said shaft, a member driven by said shaft and adapted to cause the release of said clutch, said member having an operative position and an inoperative position, and means controlled by said support for moving said member from its inoperative position into its operative position.

12. In combination, a hopper, a yieldable support below the hopper for a receptacle to be filled, a device in the hopper for forcing material from the hopper into a receptacle on the support, a driving shaft for said device, a driving pulley loose on said shaft, a clutch between said pulley and said shaft, mechanism driven by said shaft and adapted to release said clutch, said mechanism including a swinging clutch-actuating arm tending normally to swing into an inoperative position, and means controlled by said support for swinging said arm from its inoperative position into its operative position.

13. In combination, a container for material to be packaged, a yieldable member adjacent to the container for engaging a receptacle to be filled, a feeding device for forcing material from the container into a receptacle engaged by the aforesaid member and through the material entering the receptacle forcing said member away from the container, a driving member for said device, a controller for said driving member, a power actuated means for actuating said controller, and means governed by said yieldable member and constructed and arranged so as first to bring said power-actuated means into operative relation to the controller to produce a partial actuation of the controller and then to move the controller so as to complete the actuation thereof.

14. In combination, a hopper, a yieldable support below the hopper for a receptacle to be filled, a feeding device for forcing material from the hopper into a receptacle held by the support, a shaft for driving said device, driving means for the shaft, a clutch between the shaft and the driving means, a lever for controlling the clutch, mechanism including an arm for actuating said lever, said arm being movable into and out of operative relation to said lever, and means controlled by said support for first moving said arm into operative relation to said lever and then completing the actuation of the lever after it has been partially actuated by said arm.

15. In combination, a hopper, a yieldable support below the hopper for a receptacle to be filled, a feeding device for forcing material from the hopper into a receptacle held by the support, a driving shaft for said device, driving means for said shaft, a clutch between said driving means and said shaft, means including a lever for controlling said clutch, a reciprocable arm having an operative position and an inoperative position, means including a member on the shaft for reciprocating said arm, coöperating shoulders on said lever and on said arm adapted to engage with each other in the operative position of the arm to effect the release of the clutch, and means controlled by said support for engaging with said arm so as to bring it into its operative position and for engaging with the lever after it has been moved into clutch releasing position so as to bring the said shou'ders on the lever and on the arm out of engagement with each other.

In testimony whereof, I sign this specification in the presence of two witnesses.

GEORGE HOEPNER.

Witnesses:
   WM. F. FREUDENREICH,
   RUBY V. BRYDGES.